United States Patent
Määttä et al.

(10) Patent No.: US 10,908,652 B2
(45) Date of Patent: Feb. 2, 2021

(54) MODULAR HINGE FOR A COMPUTING DEVICE

(71) Applicant: Microsoft Technology Licensing, LLC, Redmond, WA (US)

(72) Inventors: Esa-Sakari Määttä, Helsinki (FI); Pasi Kemppinen, Tampere (FI); Antti Otto Karilainen, Helsinki (FI); Vicente Calvo Alonso, Kaarina (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 769 days.

(21) Appl. No.: 15/242,476

(22) Filed: Aug. 19, 2016

(65) Prior Publication Data
US 2018/0052497 A1  Feb. 22, 2018

(51) Int. Cl.
*G06F 1/16* (2006.01)
*E05D 7/00* (2006.01)
(Continued)

(52) U.S. Cl.
CPC ............ *G06F 1/1681* (2013.01); *E05D 3/12* (2013.01); *E05D 7/00* (2013.01); *E05D 11/0081* (2013.01);
(Continued)

(58) Field of Classification Search
CPC .... G06F 1/1601; G06F 1/1681; G06F 1/1616; G06F 1/1683; E05D 3/12; E05D 7/00;
(Continued)

(56) References Cited

U.S. PATENT DOCUMENTS 6,845,005 B2   1/2005   Shimano et al.
7,063,042 B2 *  6/2006   Dillingham ............. E05D 3/122
                                                      16/354
(Continued)

FOREIGN PATENT DOCUMENTS

CN          203133676 U      8/2013
CN          203870518 U     10/2014
(Continued)

OTHER PUBLICATIONS

Viswav, Pradeep, "HP Announces New Pavilion x360 Convertible Laptop Inspired by Lenovo Yoga, Price Starts at $400", Published on: Feb. 23, 2014, 15 pages, Available at: http://mspoweruser.com/hp-announces-new-pavilion-x360-convertible-laptop-inspired-by-lenovo-yoga-price-starts-at-400/.

*Primary Examiner* — Rockshana D Chowdhury (57) ABSTRACT

A modular hinge is described for a computing device where the computing device comprises two leaves detachably connected using the modular hinge. The hinge comprises a first hinge portion and a second hinge portion. Each hinge portion has a hinge portion body having a convex face configured to enable one of the leaves of the computing device to rotate against the convex face. Each hinge portion body has a mating face generally opposite the convex face, the mating face comprising at least one attachment element. Each hinge portion comprises a hinge pin configured to rotatably attach the hinge portion to one of the leaves of the computing device. The at least one attachment element of each hinge portion is configured to removably attach the hinge portions together.

20 Claims, 8 Drawing Sheets

(51) Int. Cl.
  *E05D 11/00* (2006.01)
  *E05D 11/08* (2006.01)
  *E05D 3/12* (2006.01)
(52) U.S. Cl.
  CPC .......... *E05D 11/082* (2013.01); *G06F 1/1616* (2013.01); *E05Y 2900/606* (2013.01)
(58) Field of Classification Search
  CPC ..... E05D 11/0081; E05D 11/082; E05D 5/02; E05Y 2900/606
  See application file for complete search history.

(56) References Cited

U.S. PATENT DOCUMENTS

| | | | |
|---|---|---|---|
| 7,359,209 B2* | 4/2008 | Lo | G06F 1/1616 |
| | | | 16/259 |
| 8,578,561 B2 | 11/2013 | Chuang | |
| 9,158,135 B1 | 10/2015 | Chaboud et al. | |
| 9,801,290 B2* | 10/2017 | Ahn | G06F 1/1652 |
| 9,848,502 B1* | 12/2017 | Chu | E05D 11/1078 |
| 10,088,864 B2* | 10/2018 | Aoki | G06F 1/1683 |
| 10,107,646 B2* | 10/2018 | Szeto | G01D 5/145 |
| 10,281,951 B2* | 5/2019 | Vic | E05D 11/0054 |
| 10,317,934 B2* | 6/2019 | Hampton | G06F 1/1616 |
| 10,352,354 B1* | 7/2019 | Hsu | G06F 1/1652 |
| 10,365,686 B2* | 7/2019 | Tucker | G06F 1/1618 |
| 10,459,493 B2* | 10/2019 | Lee | E05D 1/00 |
| 10,571,977 B2* | 2/2020 | Escamilla | G06F 1/1616 |
| 2005/0101358 A1 | 5/2005 | Carpenter | |
| 2005/0239520 A1* | 10/2005 | Stefansen | H04M 1/022 |
| | | | 455/575.1 |
| 2011/0205695 A1 | 8/2011 | Hassemer et al. | |
| 2012/0262857 A1* | 10/2012 | Fukaya | G06F 1/1681 |
| | | | 361/679.01 |
| 2013/0111704 A1 | 5/2013 | Mitsui | |
| 2013/0318746 A1 | 12/2013 | Kuramochi | |
| 2014/0184904 A1 | 7/2014 | Lam et al. | |
| 2015/0249302 A1 | 9/2015 | Witter et al. | |
| 2018/0224897 A1* | 8/2018 | Tucker | G06F 1/1654 |

FOREIGN PATENT DOCUMENTS

| | | |
|---|---|---|
| GB | 2008940 A | 6/1979 |
| WO | 1995000406 A1 | 1/1995 |

\* cited by examiner

MODULAR HINGE FOR A COMPUTING DEVICE

BACKGROUND

There is an increasing need to provide versatile computing devices which can be placed into a plurality of different configurations suited to different modes of use. Examples of different modes of use include viewing videos, browsing content, authoring content, participating in communication calls, sending and receiving messages, closing the computing device for protection during transport, and others. This versatility is especially beneficial in the case of mobile computing devices as in mobile scenarios users typically have limited access to a variety of different types of computing device.

One way of enabling a computing device to be configurable in more than one manner is to connect two parts of the computing device together using one or more hinges such as in the case of a laptop computer.

The embodiments described below are not limited to implementations which solve any or all of the disadvantages of known hinges for computing devices.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A modular hinge is described for a computing device where the computing device comprises two leaves detachably connected using the modular hinge. The hinge comprises a first hinge portion and a second hinge portion. Each hinge portion has a hinge portion body having a convex face configured to enable one of the leaves of the computing device to rotate against the convex face. Each hinge portion body has a mating face generally opposite the convex face, the mating face comprising at least one attachment element. Each hinge portion comprises a hinge pin configured to rotatably attach the hinge portion to one of the leaves of the computing device. The at least one attachment element of each hinge portion is configured to removably attach the hinge portions together, such that in use the leaves of the computing device are hinged together when the hinge portions are attached to one another and the leaves of the computing device are separable by disconnecting the hinge portions.

In some examples there is a hinge portion of a modular hinge for a computing device, the computing device comprising two leaves detachably connected using the modular hinge. The hinge portion comprises a hinge portion body having a convex face configured to enable a leaf of the computing device to rotate against the convex face, and having a mating face generally opposite the convex face, the mating face comprising at least one attachment element; the hinge portion comprising a hinge pin configured to rotatably attach the hinge portion to one of the leaves of the computing device. The at least one attachment element is configured to removably attach the hinge portion to another hinge portion in use, the other hinge portion being attached to the other leaf of the computing device.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

Figure 1:
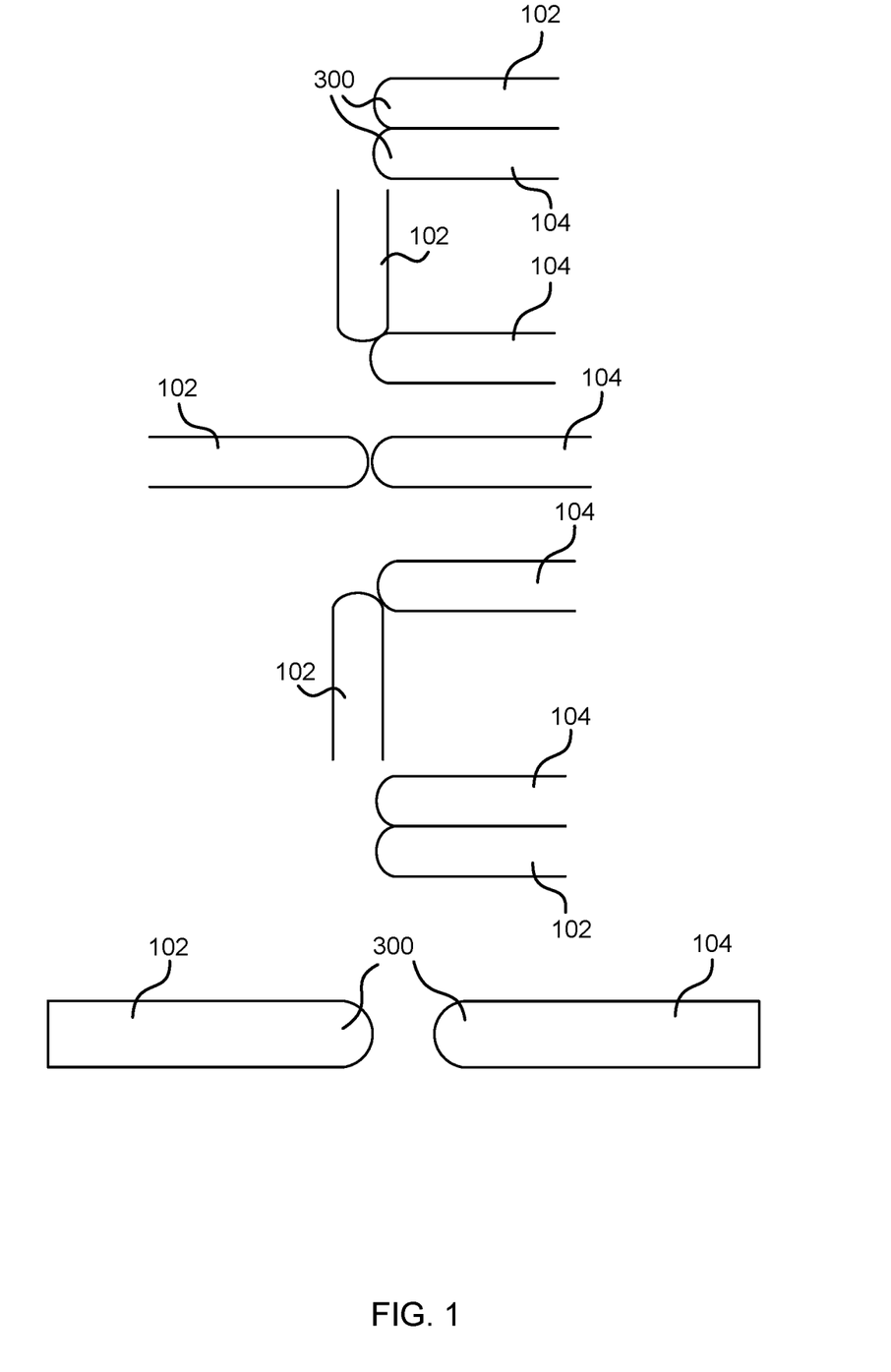
FIG. 1 is a schematic diagram of a side view of a computing device having two leaves.

As shown in FIG. 1 a computing device comprising two leaves 102, 104 provides versatility where the leaves can either be connected together as illustrated in FIG. 1 or disconnected as illustrated in the bottom part of FIG. 1. (FIG. 1 shows a side view of part of the leaves.) One or more modular hinges (not visible in FIG. 1) is used to enable the leaves 102, 104 to be connected together or separated, as the modular hinge has two portions which are removably connected. When the modular hinge portions are joined the leaves of the device are rotatable with respect to one another. In some examples there is as much as 360 degrees of rotation possible between the leaves of the computing device, as illustrated in FIG. 1, although this is not essential as any degree of rotation may be used. The modular hinge enables versatility of configuration of the computing device through its modular nature, that is, the ability of portions of the hinge to be connected or disconnected. The modular hinge also facilitates rotation of the leaves of the device as mentioned and this enables users to place the computing device in a wide range of configurations as illustrated in FIG. 1. In some cases the module hinge is configured to hold the computing device stable in the configurations illustrated in FIG. 1 as well as intermediate positions. However, this is not essential.

The modular hinge is configured to keep the computing device stable in some but not all configurations in some examples.

In some examples, the modular hinge facilitates transfer of power and/or data between the leaves of the computing device. This improves versatility in situations where one computing device leaf does not have its own power supply, or where one computing device leaf has a power supply such as a battery which is running low. The ability to transfer data between the leaves of the computing device enhances versatility as well since the leaves of the computing device are able to synchronize and or share computing tasks. By using the modular hinge to transfer power and/or data between the leaves of the computing device the burden on the user of needing to connect separate power cables, or signaling cables is reduced. In this way the modular hinge provides several types of functionality (such as attachment and rotation, as well as optional data transfer and optional power transfer) in a single modular hinge mechanism. This gives simplicity of operation from the point of view of the end user.

At least one of the computing device leaves 102, 104 comprises a housing holding electronic components of the computing device and at least one of the computing device leaves 102, 104 has a display screen supported on or integral with the housing. In some examples, each of the leaves has a display screen. In some of the examples each of the leaves has electronic components and is operable substantially independently of the other leave as a computing device.

Each leaf has a joining edge (see 300 of FIG. 3) which is adjacent to the joining edge of the other leaf when the modular hinge portions are joined together. In various examples, the joining edge has a profile which is substantially convex. The term profile is used to refer to a perimeter of the joining edge. As the joining edges are convex they are able to pivot against each other as illustrated in FIG. 1 when the computing device leaves are joined using the one or more modular hinges.

Figure 2:
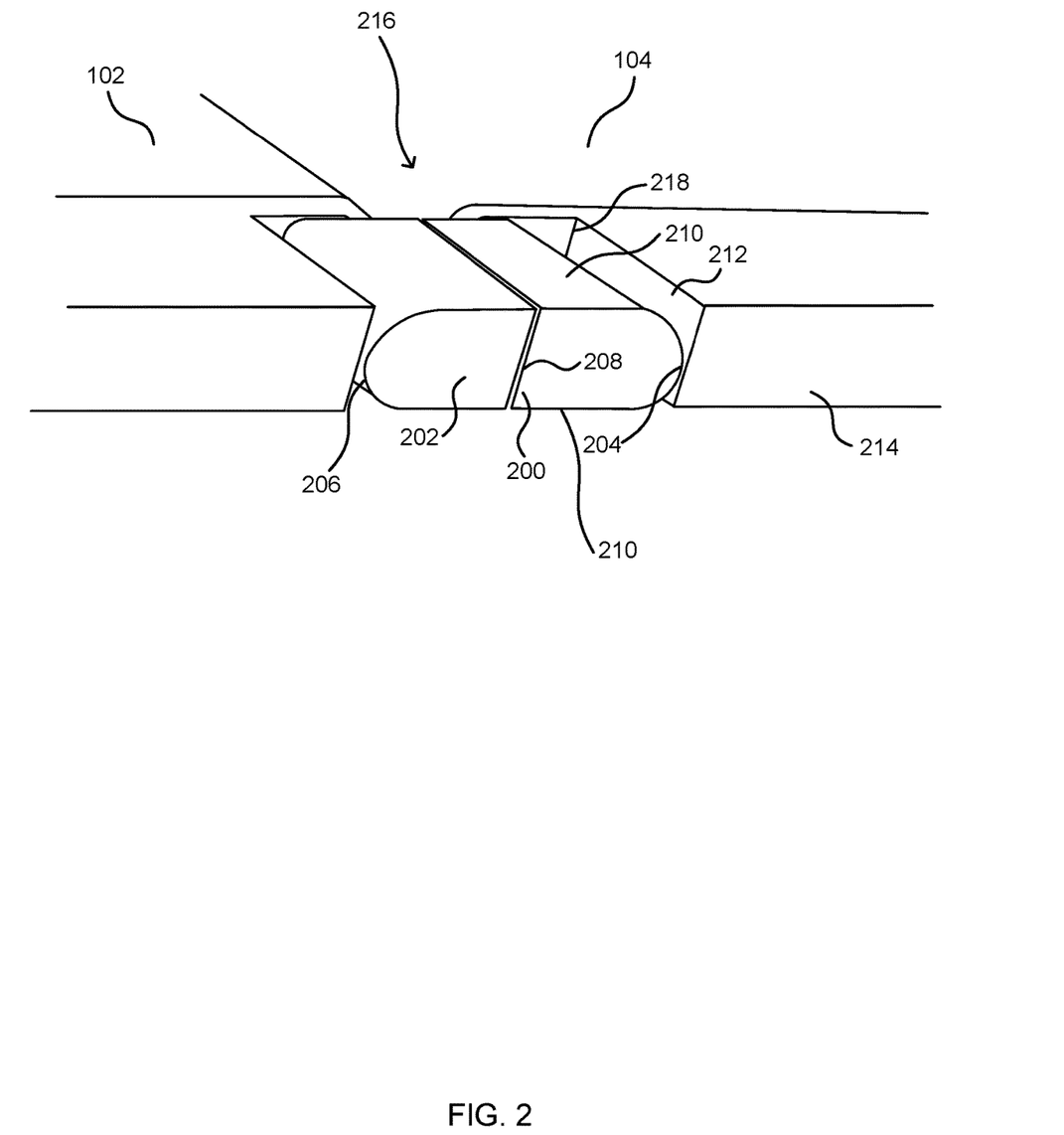
FIG. 2 is a schematic diagram of a modular hinge installed on a computing device having two leaves, such as the computing device of FIG. 1.

FIG. 2 shows an example of a modular hinge for a computing device, the computing device comprising two leaves 102, 104 detachably connected using the modular hinge. The hinge comprises a first hinge portion and a second hinge portion each hinge portion comprising a hinge portion body 200, 202 having a convex face 204, 206 configured to enable a leaf 104, 102 of the computing device to rotate against the convex face 204, 206, and having a mating face 208 generally opposite the convex face 204, 206. The mating face comprises at least one attachment element (not visible in FIG. 2) and the hinge portion comprising a hinge pin (see FIG. 6 item 602) configured to rotatably attach the hinge portion to one of the leaves 102, 104 of the computing device.

The at least one attachment element of each hinge portion body 200, 202 is configured to removably attach the hinge portions together, such that in use the leaves of the computing device are hinged together (as shown in FIG. 2) when the hinge portions are attached to one another (as shown in FIG. 2).

In the example of FIG. 2 each leaf has a body or housing 214 and a corner 218 of each housing 214 is cut away to receive one of the hinge portion bodies 200, 202 as illustrated. Each hinge portion body has a stopping face 210 configured to abut against abutment face 212 of the computing device leaf. In this way each hinge portion body of FIG. 2 is able to rotate through substantially 90 degrees in a clockwise direction and through substantially 90 degrees in an anticlockwise direction.

Figure 3:
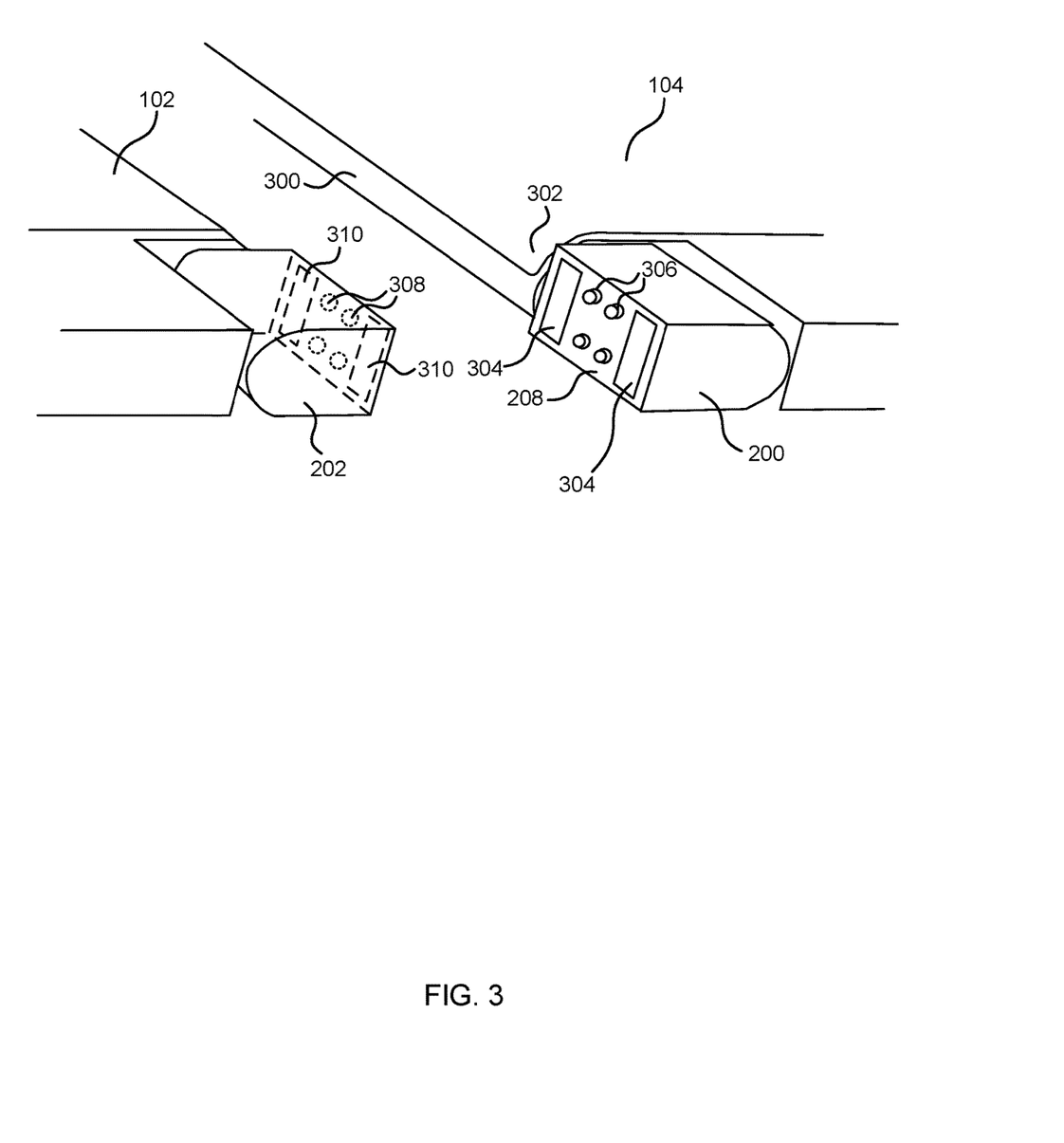
FIG. 3 is a schematic diagram of the modular hinge of FIG. 2 showing portions of the hinge disconnected.

FIG. 3 shows an example situation where portions of a modular hinge are disconnected so that the leaves 102, 104 of the computing device are separated. In this example the joining edge 300 of one of the leaves 104 is visible and a flexible display screen 302 is shown supported on leaf 104 so that it curves around at least part of a convex face of the joining edge 300.

FIG. 3 shows a first example of an attachment element comprising magnets 304 and ferritic metal plates 310. However, this is only one type of attachment element and many other types of attachment element are possible as described and illustrated later in this document. In some examples the magnets 304 and ferritic metal plates 310 act as power transfer components to transfer power between the leaves. In some examples the magnets 304 and ferritic metal plates 310 act as signal transfer components to transfer signals between the leaves.

Figure 4:
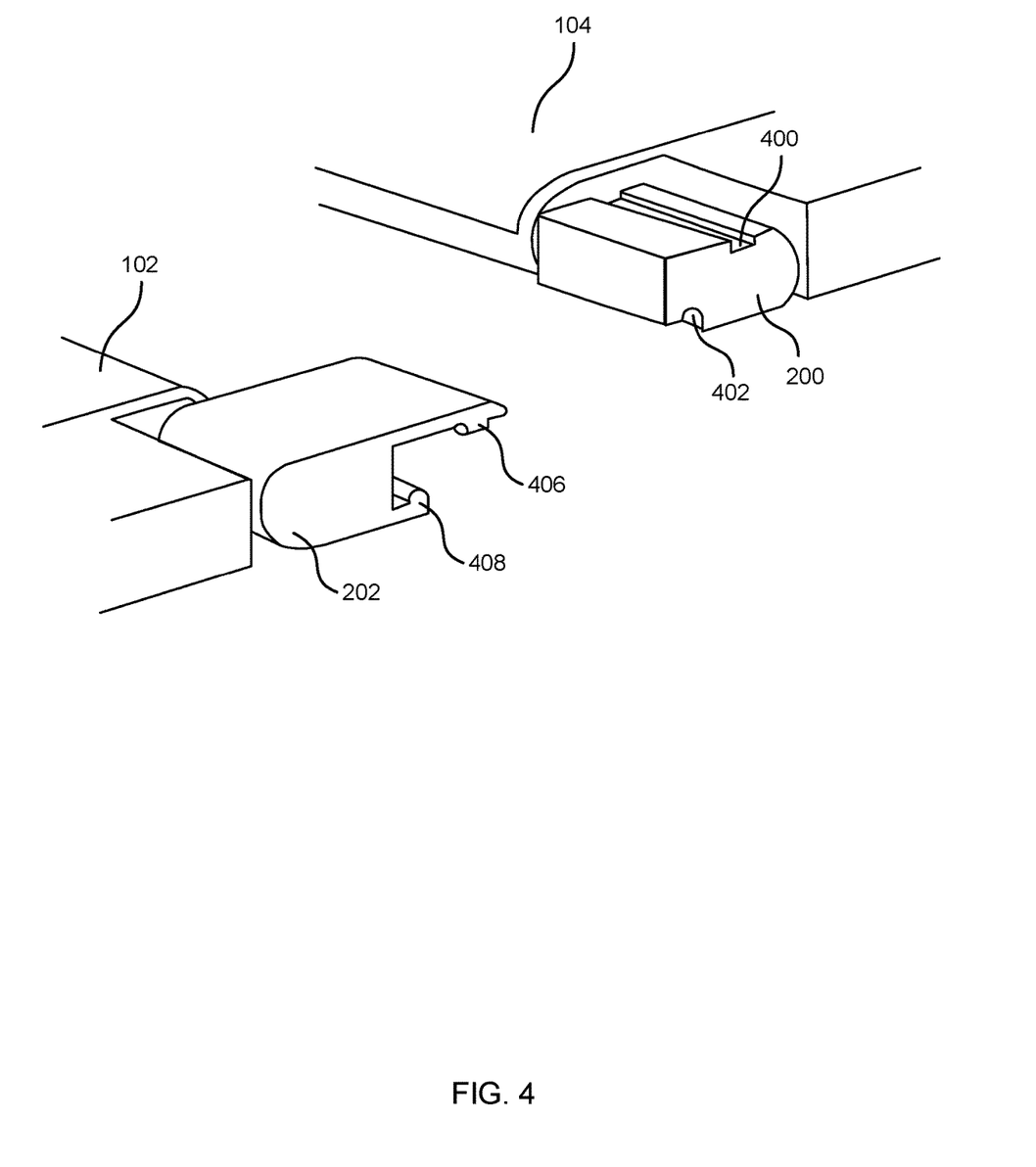
FIG. 4 is a schematic diagram of another modular hinge installed on a computing device having two leaves, and showing the portions of the hinge disconnected.

FIG. 4 shows a modular hinge with another type of attachment element. In this case the attachment element is a hook or clip element. For example, hinge portion body 200 comprises two channels 400, 402 which are substantially parallel to the axis of rotation of the hinge portion body and are located in the stopping faces of the hinge portion body. The other hinge portion body 202 comprises ridges 406, 408 which are substantially parallel to the axis of rotation of the hinge portion body 202 and which are shaped and positioned to engage with the channels 400, 402 of the other hinge portion body. The hinge portion body 202 has a protruding portion from which one of the ridges 406 hangs. A user is able to hook or clip hinge portion body 200 into hinge portion body 202 in order to attach the two hinge portion bodies together.

Figure 5:
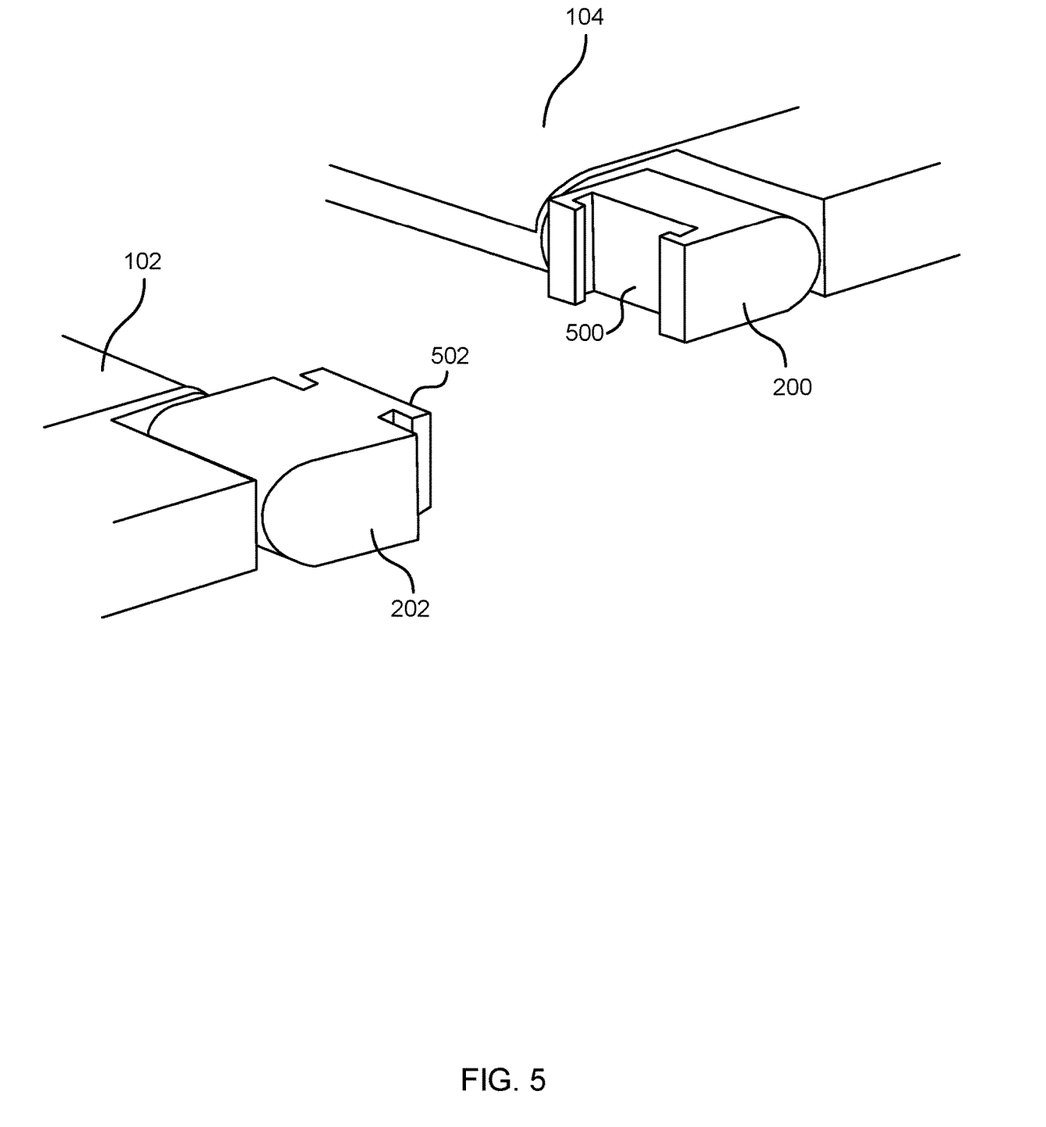
FIG. 5 is a schematic diagram of another modular hinge installed on a computing device having two leaves, and showing the portions of the hinge disconnected.

FIG. 5 shows a modular hinge with a sliding joint element. In this example, one of the hinge portion bodies 200 comprises a channel 500 which is substantially perpendicular to an axis of rotation of the hinge portion body. The other hinge portion body 202 comprises a sliding joint element 502 shaped and sized to slidably engage with the channel 500. The attachment element thus comprises a sliding joint element which is a channel or a ridge of a sliding joint. The user is able to slide element 502 into channel 500 in order to join the portions of the hinge together and is able to slide the element 502 out of channel 500 in order to detach the hinge portions.

Figure 6:
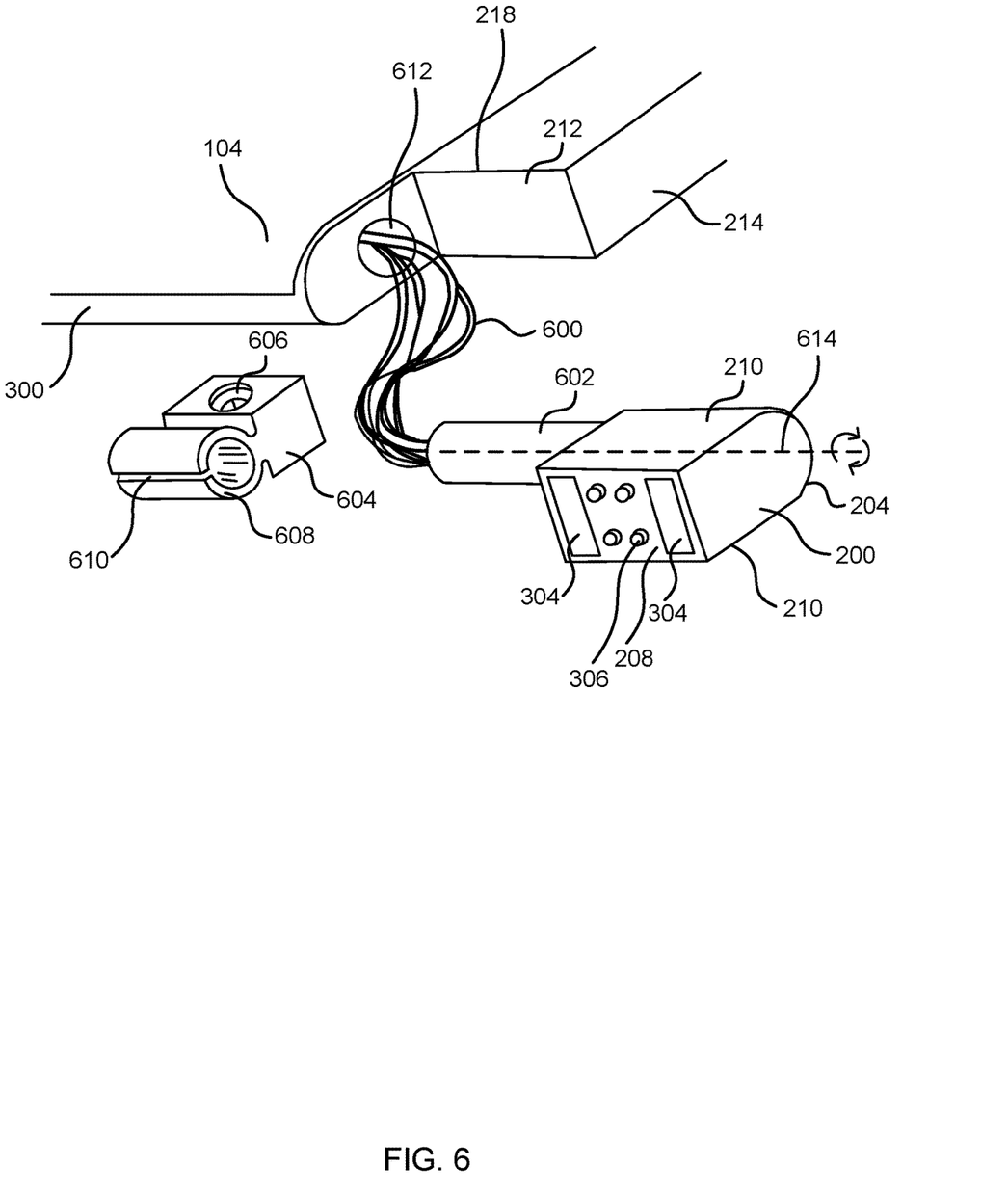
FIG. 6 is a schematic diagram of one portion of the modular hinge of FIG. 3 together with a friction element.

FIG. 6 is an exploded view in which a hinge portion body 200 is visible with its hinge pin 602 and the axis of rotation 614 of the hinge portion body 210 is illustrated. The housing 214 of the leaf 104 of the computing device has a hinge pin channel 612 into which the hinge pin 602 is inserted during manufacture. The hinge pin channel 612 is substantially parallel to the joining edge 300. In some examples the hinge pin has a friction generating surface configured to generate friction between the hinge pin and a leaf of the computing device. For example, the friction generating surface comprises one or more protrusions from the outer surface of hinge pin 602. In some examples a friction element 604 is attached inside housing 214 using screw hole 606. The friction element comprises a channel 608 sized and shaped to receive the hinge pin 602 in a friction fit. For example, the channel 608 is made of flexible material such as metal or plastic and has a split 610 along at least part of its length to enable the channel 608 to expand slightly when the hinge pin 602 is inserted into the channel during manufacture. The friction element is configured to allow frictional rotation of a hinge pin in the hinge pin hole. By giving frictional rotation of the hinge pin about axis 614 the computing device is stable in various configurations as illustrated in FIG. 1 where the leaves of the computing device are rotated with respect to one another by different amounts.

As shown in FIG. 6 at least one of the hinge portion bodies is generally cuboid with one of the faces of the cuboid being the convex face 204 and another of the faces of the cuboid being the mating face 208, and where the cuboid comprises two stopping faces 210 both of which are generally perpendicular to the mating face 208 and the convex face 204.

FIG. 6 shows the attachment element as being magnets 304. However, the attachment element can be any one or more of: a magnet, a ferritic metal element, a hook, a clip, a sliding joint element, a hook and loop fastener element, a pin, a spring loaded pin, a receiving element for a pin.

In some examples the hinge portion bodies comprise power transfer components, configured to transfer power between the leaves of the computing device. For example, the magnets 304 are operable to transfer power between the leaves of the computing device in some examples. In this way, at least one of the power transfer components is integral with the attachment element in some examples.

Figure 7:
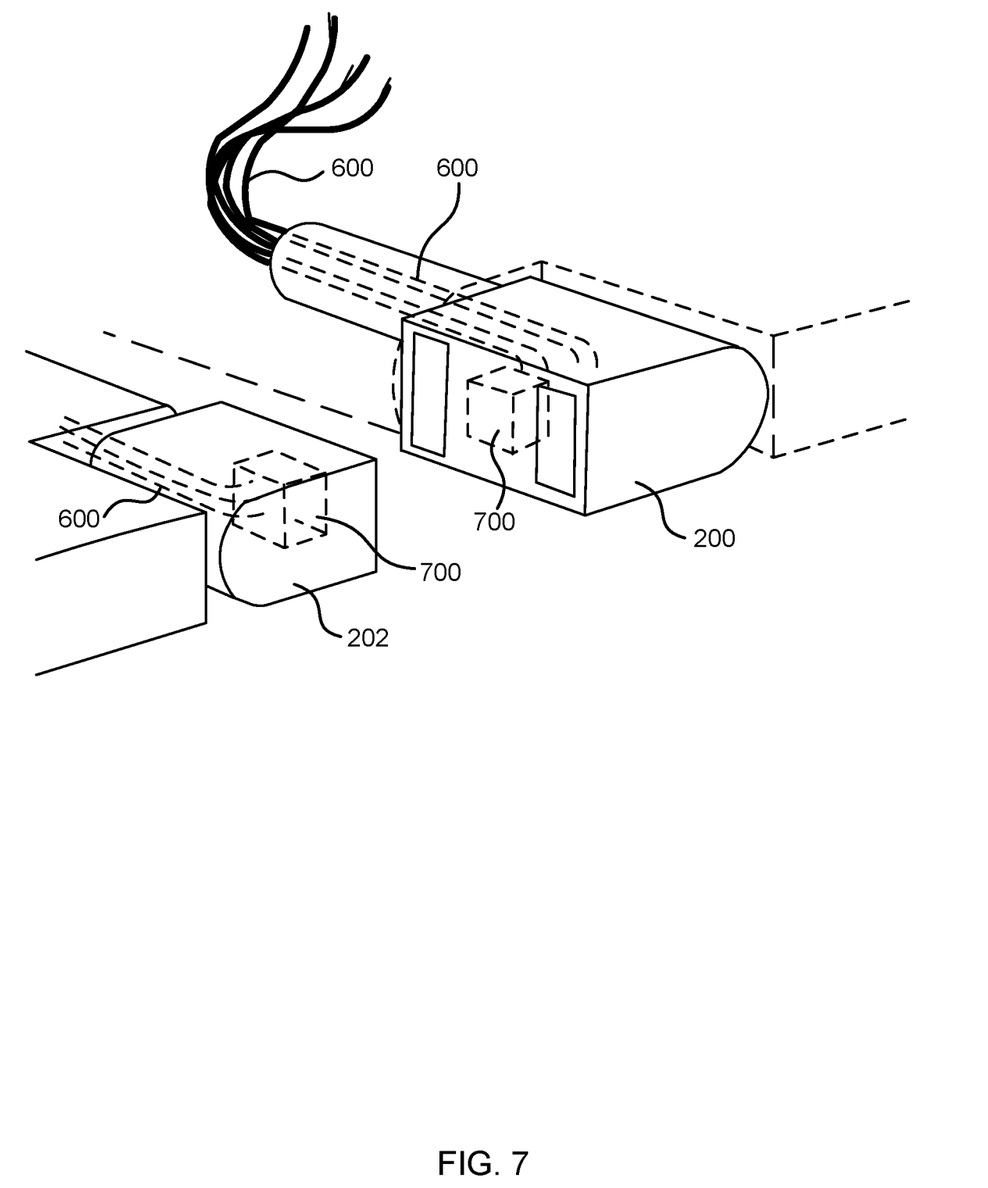
FIG. 7 is a schematic diagram of a modular hinge having a local radio link.

In some examples, the hinge portion bodies comprise signal transfer components, configured to transfer data signals between the leaves of the computing device. FIG. 6 shows an example where a set of spring loaded pins 306 are used to transfer data signals between the leaves. FIG. 7 shows an example where a local radio link is used to transfer data signals between the leaves and this is achieved by housing radio transceivers 700 in the hinge portion bodies 200, 202 and connecting data signaling and power cables 600 to the radio transceivers 700 through the hinge pin and hinge portion body. Empirical testing has found that local radio links are typically very directional so communication over the local radio link may break down when the leaves of the device are rotated in particular orientations. However, by having the local radio transceivers in the hinge portion bodies directionality of the local radio link is overcome since the hinge portion bodies are attached in use.

In some cases at least one of the signal transfer components is integral with the attachment element. For example, signals are transferred through the magnets 304. For example, there may be several magnets in a row replacing the spring loaded pins, radio link or optical data transfer components.

For example, a signal transfer component comprises any one or more of: a magnet, a ferritic metal element, a spring loaded pin, a hook, a clip, a sliding joint element, a receiving element for a pin, an optical signaling mechanism, a radio transceiver, an infra-red signaling mechanism.

Figure 8:
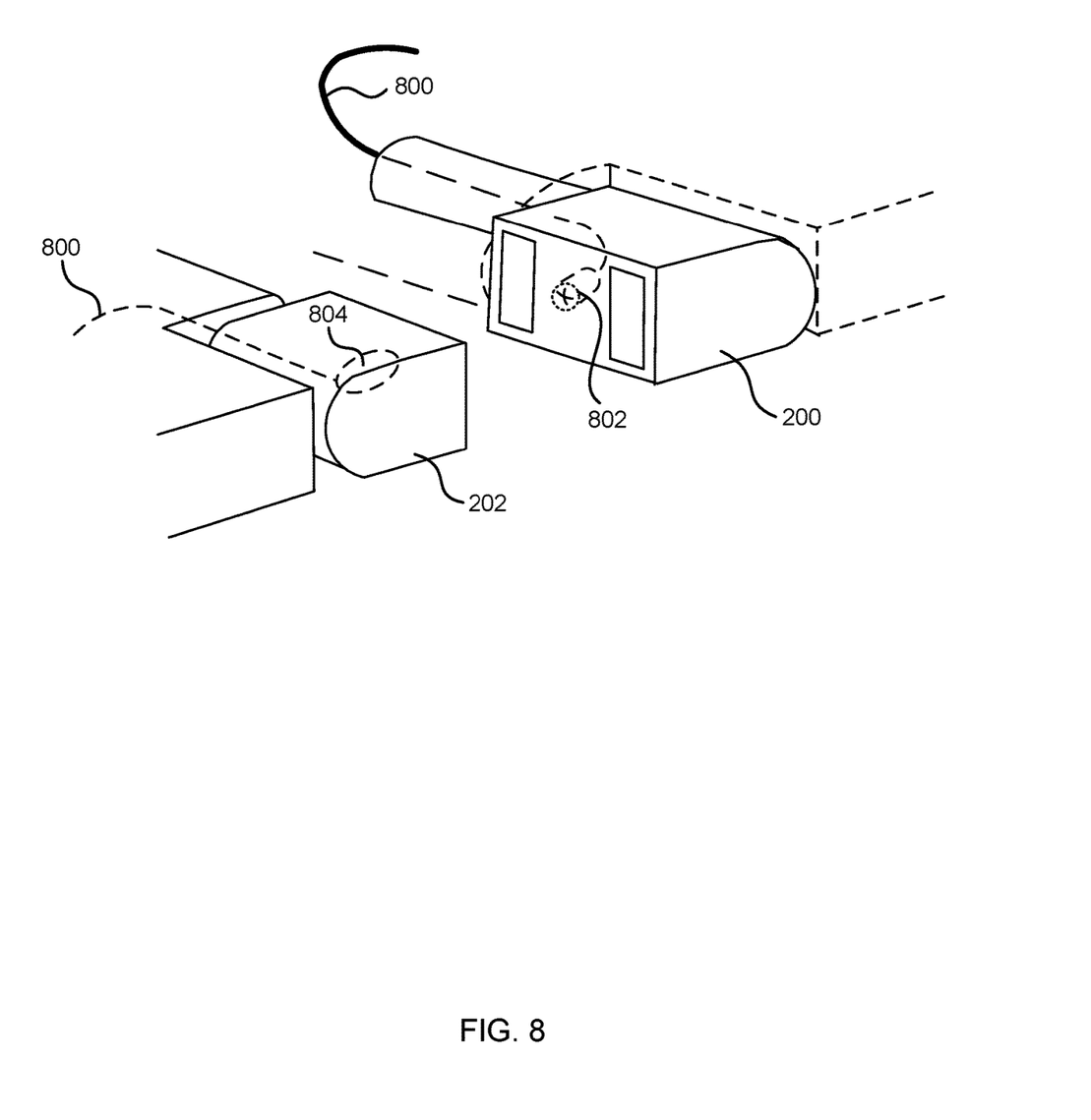
FIG. 8 is a schematic diagram of a modular hinge having optical fibre communications.

FIG. 8 shows an example where an optical signaling mechanism is used. In this case optical fibre 800 passes into the hinge portion body 200, 202 via the hinge pin and terminates in a lens and/or optical receiving element. For example, an optical signal is generated at another end of the optical fiber using components inside the housing of the device. In some examples the optical signal is generated inside the hinge body an and in this case several electrical cables pass into the hinge body and more space inside the hinge body is taken up as compared with using the arrangement of FIG. 8 with an optical fibre and lens system 802, 804.

As shown in FIGS. 6 to 8 there are examples in which the body of at least one hinge portion is substantially hollow and holds at least one of the signal transfer components. There are also examples where the body and hinge pin of at least one hinge portion is substantially hollow to hold electrical signaling cables 600 and/or power cables 600.

As shown in FIG. 6 a corner of at least one of the leaves is cut away to receive a hinge portion body (as shown in FIG. 2). The cut away corner 218 of FIG. 2 comprises an abutment face 212 which abuts against a stopping face 210 of a hinge portion body, and where the abutment face 212 and the stopping face 210 are configured to prevent rotation of the hinge portion with respect to the leaf by more than substantially 90 degrees. This prevents a user from rotating the leaves 102, 104 through 360 degrees in a first direction and then continuing to rotate the leaves in that same direction. This improves robustness of the modular hinge to fatigue and breaking. In examples where cables pass into a hinge portion body via the hinge pin it also prevents tangling and twisting of the cables and so prolongs the life of those cables.

Alternatively or in addition to the other examples described herein, examples include any combination of the following:

A modular hinge for a computing device, the computing device comprising two leaves detachably connected using the modular hinge, the hinge comprising:

a first hinge portion and a second hinge portion;

each hinge portion comprising a hinge portion body having a convex face configured to enable a leaf of the computing device to rotate against the convex face, and having a mating face generally opposite the convex face, the mating face comprising at least one attachment element; the hinge portion comprising a hinge pin configured to rotatably attach the hinge portion to one of the leaves of the computing device; and wherein the at least one attachment element of each hinge portion body is configured to removably attach the hinge portions together, such that in use the leaves of the computing device are hinged together when the hinge portions are attached to one another.

The hinge described above wherein at least one of the hinge pins comprises a friction generating surface configured to generate friction between the hinge pin and a leaf of the computing device.

The hinge described above wherein at least one of the hinge portion bodies is generally cuboid with one of the faces of the cuboid being the convex face and another of the faces of the cuboid being the mating face, and where the cuboid comprises two substantially flat faces both of which are generally perpendicular to the mating face and the convex face.

The hinge described above wherein the at least one attachment element of the first or the second hinge portion comprises any one or more of: a magnet, a ferritic metal element, a hook, a clip, a sliding joint element, a hook and loop fastener element, a pin, a spring loaded pin, a receiving element for a pin.

The hinge described above wherein the hinge portion bodies comprise power transfer components, configured to transfer power between the leaves of the computing device.

The hinge described above wherein at least one of the power transfer components is integral with the attachment element.

The hinge described above wherein the hinge portion bodies comprise signal transfer components, configured to transfer data signals between the leaves of the computing device.

The hinge described above wherein at least one of the signal transfer components is integral with the attachment element.

The hinge described above wherein a signal transfer component comprises any one or more of: a magnet, a ferritic metal element, a spring loaded pin, a hook, a clip, a sliding joint element, a receiving element for a pin, an optical signaling mechanism, a lens, an optical fibre, a radio transceiver, an infra-red signaling mechanism.

The hinge described above wherein the body of at least one hinge portion is substantially hollow and holds at least one of the signal transfer components.

The hinge described above wherein the body and hinge pin of at least one hinge portion is substantially hollow to hold electrical signaling cables and/or power cables.

A computing device comprising:
a first leaf and a second leaf; and
at least one modular hinge detachably connecting the first and second leaves;
  the hinge comprising:
  a first hinge portion and a second hinge portion; each hinge portion comprising a hinge portion body having a convex face configured to enable a leaf of the computing device to rotate against the convex face, and having a mating face generally opposite the convex face, the mating face comprising at least one attachment element; the hinge portion comprising a hinge pin configured to rotatably attach the hinge portion to one of the leaves of the computing device; and
  wherein the at least one attachment element of each hinge portion body is configured to removably attach the hinge portions together, such that in use the leaves of the computing device are hinged together when the hinge portions are attached to one another and the leaves of the computing device are separated when the hinge portions are disconnected.

The computing device described above wherein each leaf comprises a leaf body having a substantially flat surface abutting the convex face of the hinge portion body when the leaves of the computing device are opened.

The computing device described above wherein each leaf has a joining edge configured to be hinged to the joining edge of the other leaf by the modular hinge, and wherein the joining edge is substantially convex to facilitate rotation of the leaves using the hinge when the hinge portions are connected in use.

The computing device described above wherein each leaf has a hinge pin hole in a body of the leaf, the hinge pin hole being substantially parallel to a joining edge of the leaf the joining edge being configured to be hinged to a joining edge of the other leaf.

The computing device described above wherein at least one of the hinge pin holes comprises a friction element configured to allow frictional rotation of a hinge pin in the hinge pin hole.

The computing device described above wherein a corner of at least one of the leaves is cut away to receive a hinge portion body.

The computing device described above wherein the cut away corner comprises an abutment face which abuts against a stopping face of a hinge portion body, and where the abutment face and the stopping face are configured to prevent rotation of the hinge portion with respect to the leaf by more than substantially 90 degrees.

A hinge portion of a modular hinge for a computing device, the computing device comprising two leaves detachably connected using the modular hinge, the hinge portion comprising:
  a hinge portion body having a convex face configured to enable a leaf of the computing device to rotate against the convex face, and having a mating face generally opposite the convex face, the mating face comprising at least one attachment element; the hinge portion comprising a hinge pin configured to rotatably attach the hinge portion to one of the leaves of the computing device; and
  wherein the at least one attachment element is configured to removably attach the hinge portion to another hinge portion in use, the other hinge portion being attached to the other leaf of the computing device.

A leaf of a computing device, the leaf comprising a hinge portion as described above.

A hinge portion of a modular hinge for a computing device, the computing device comprising two leaves detachably connected using the modular hinge, the hinge portion comprising:
  means for enabling a leaf of the computing device to rotate against a convex face of the hinge portion;
  means for rotatably attaching the hinge portion to one of the leaves of the computing device; and
  means for removably attaching the hinge portion to another hinge portion in use, the other hinge portion being attached to the other leaf of the computing device.

For example, the means for enabling the leaf to rotate against the convex face comprises the hinge pin and the hinge pin channel in the housing. For example, the means for rotatably attaching the hinge portion to one of the leaves comprises the hinge pin and the hinge pin channel in the housing. For example, the means for removably attaching the hinge portion comprises any one or more of a magnet, clip, hook, sliding joint element, or other attachment element described herein or known to the skilled person.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The invention claimed is:

1. A modular hinge for a computing device, the computing device comprising two leaves detachably connected using the modular hinge, the hinge comprising:
   a first hinge portion connected to a first leaf;
   a second hinge portion connected to a second leaf; each of the first hinge portion and the second hinge portion comprising a hinge portion body having a convex face configured to enable a corresponding one of the first leaf and the second leaf to rotate against the convex face, and having a mating face generally opposite the convex face, the mating face comprising at least one attachment elements, each of the first hinge portion and the second hinge portion further comprising a hinge pin configured to rotatably attach each of the first hinge portion and the second hinge portion to a corresponding one of the first leaf and the second leaf; and
   wherein the at least one attachment element on each of the first hinge portion and the second hinge portion is configured to removably attach the first hinge portion and the second hinge portion together, such that in use the first leaf and the second leaf of the computing device are hinged together and act as a single device when the first hinge portion and the second hinge portion are attached to one another, and when the first leaf and the second leaf are not hinged together, each of the first leaf comprising the first hinge portion and the second leaf comprising the second hinge portion is configured to operate as independent devices.

2. The hinge of claim 1 wherein at least one of the hinge pins comprises a friction generating surface configured to generate friction between the hinge pin and a leaf of the computing device.

3. The hinge of claim 1 wherein at least one of the hinge portion bodies is generally cuboid with one of the faces of the cuboid being the convex face and another of the faces of the cuboid being the mating face, and where the cuboid comprises two substantially flat faces both of which are generally perpendicular to the mating face and the convex face.

4. The hinge of claim 1 wherein the at least one attachment element of the first or the second hinge portion comprises any one or more of: a magnet, a ferritic metal element, a hook, a clip, a sliding joint element, a hook and loop fastener element, a pin, a spring loaded pin, a receiving element for a pin.

5. The hinge of claim 1 wherein the hinge portion bodies comprise power transfer components, configured to transfer power between the leaves of the computing device.

6. The hinge of claim 5 wherein at least one of the power transfer components is integral with the attachment element.

7. The hinge of claim 1 wherein the hinge portion bodies comprise signal transfer components, configured to transfer data signals between the leaves of the computing device.

8. The hinge of claim 7 wherein at least one of the signal transfer components is integral with the attachment element.

9. The hinge of claim 7 wherein a signal transfer component comprises any one or more of: a magnet, a ferritic metal element, a spring loaded pin, a hook, a clip, a sliding joint element, a receiving element for a pin, an optical signaling mechanism, a lens, an optical fibre, a radio transceiver, an infra-red signaling mechanism.

10. The hinge of claim 7 wherein the body of at least one hinge portion is substantially hollow and holds at least one of the signal transfer components.

11. The hinge of claim 1
    further comprising:
    a third hinge portion connected to the first leaf; and
    a fourth hinge portion connect to the second leaf;
    each of the third hinge portion and the fourth hinge portion comprising a body having a second mating face comprising a second attachment element, wherein the second attachment element on each of the third hinge portion and the fourth hinge portion is configured to removably attach the third hinge portion and the fourth hinge portion together, such that in use the first leaf and the second leaf of the computing device are hinged together and act as a single device when the first and second hinge portions are attached to one another and when the third and fourth hinge portions are attached to one another, and when first leaf and the second leaf are not hinged together, each of the first leaf comprising the first and third hinge portions and the second leaf comprising the second and fourth hinge portions is configured to operate as independent devices.

12. A computing device comprising: a first leaf comprising a first hinge portion; a second leaf comprising a second hinge portion;
    each of the first hinge portion and the second hinge portion comprising a hinge portion body having a convex face configured to enable a corresponding one of the first leaf and the second leaf of the computing device to rotate against the convex face, and having a mating face generally opposite the convex face, the mating face comprising at least one attachment element;
    each of the first hinge portion and the second hinge portion comprising a hinge pin configured to rotatably attach each of the first hinge portion and the second hinge portion to a corresponding one of the first leaf and the second leaf of the computing device; and
    wherein the at least one attachment element one each of the first hinge portion and the second hinge portion is configured to removably attach the first hinge portion and the second hinge portion together, such that the first leaf and the second leaf of the computing device act as a single device when the first leaf and the second leaf are hinged together when the first hinge portion and the second hinge portion are attached to one another and the first leaf and the second leaf of the computing device are configured to operate as independent devices when each of the leaves are separated when the first hinge portion and the second hinge portion are disconnected from one another and remain attached to the corresponding first leaf and the second leaf.

13. The computing device of claim 12 wherein each leaf comprises a leaf body having a substantially flat surface abutting the convex face of the hinge portion body when the leaves of the computing device are opened.

14. The computing device of claim 12 wherein each leaf has a joining edge configured to be hinged to the joining edge of the other leaf by the modular hinge, and wherein the joining edge is substantially convex to facilitate rotation of the leaves using the hinge when the hinge portions are connected in use.

15. The computing device of claim 12 wherein each leaf has a hinge pin hole in a body of the leaf, the hinge pin hole being substantially parallel to a joining edge of the leaf the joining edge being configured to be hinged to a joining edge of the other leaf.

16. The computing device of claim 15 wherein at least one of the hinge pin holes comprises a friction element configured to allow frictional rotation of a hinge pin in the hinge pin hole.

17. The computing device of claim 12 wherein a corner of at least one of the leaves is cut away to receive a hinge portion body.

18. The computing device of claim 17 wherein the cut away corner comprises an abutment face which abuts against a stopping face of a hinge portion body, and where the abutment face and the stopping face are configured to prevent rotation of the hinge portion with respect to the leaf by more than substantially 90 degrees.

19. A hinge portion body for a computing device, the computing device comprising two leaves detachably connected using the modular hinge, the hinge portion body comprising:

a first hinge portion and a second hinge portion, each of the first hinge portion and the second hinge portion having a convex face configured to enable a corresponding one of the first leaf portion and the second leaf of the computing device to rotate against the convex face, and having a mating face generally opposite the convex face, the mating face comprising at least one attachment element, each of the first hinge portion and the second hinge portion further comprising a hinge pin configured to rotatably attach the first hinge portion and the second hinge portion to a corresponding one of the first leaf and the second leaf of the computing device; and wherein the at least one attachment element on each of the first hinge portion and the second hinge portion is configured to removably attach the first hinge portion and the second hinge portion together, such that in use, the first leaf and the second leaf of the computing device are hinged together and act as a single device when the first hinge portion and the second hinge portion are hinged together, and wherein the first leaf comprising the first hinge portion and the second leaf comprising the second hinge portion are configured to operate as independent devices while detached from one another.

20. A leaf of a computing device, the leaf comprising a hinge portion as claimed in claim 19.

\* \* \* \* \*